(No Model.)
U. S. DRAYER.
VEHICLE WHEEL.
No. 598,913. Patented Feb. 15, 1898.
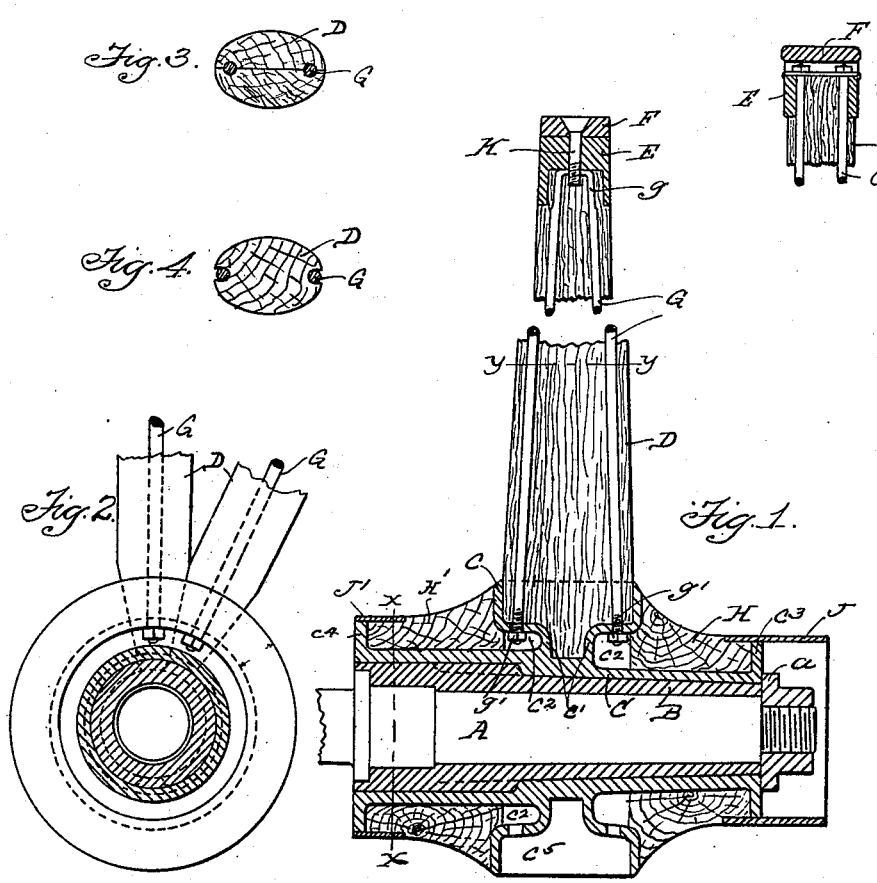
Witnesses.
Caleb J. Bieber
David Levan
Ulysses S. Drayer, Inventor.
by
Attorney.
THE NORRIS PETERS CO., PHOTO-LITHO., WASHINGTON, D. C.

UNITED STATES PATENT OFFICE.

ULYSSES S. DRAYER, OF READING, PENNSYLVANIA.

VEHICLE-WHEEL.

SPECIFICATION forming part of Letters Patent No. 598,913, dated February 15, 1898.

Application filed September 9, 1897. Serial No. 651,014. (No model.)

*To all whom it may concern:*

Be it known that I, ULYSSES S. DRAYER, a citizen of the United States, residing at Reading, county of Berks, State of Pennsylvania, have invented certain Improvements in Vehicle-Wheels, of which the following is a specification.

My invention relates particularly to vehicle-wheels; and it consists in certain improvements which are fully described in connection with the accompanying drawings.

Figure 1 is a cross-sectional view through the hub, spoke, and rim of a portion of a wheel embodying my improvements. Fig. 2 is a cross-sectional view of the metallic hub, taken on the line $x\,x$ of Fig. 1. Fig. 3 shows the spoke in cross-section on the line $y\,y$ of Fig. 1, and Fig. 4 is a similar view showing a slightly-modified construction. Fig. 5 shows a modified rim connection.

A represents the arm of an axle, and B the box or wheel bearing for the same, which is fixed in the hub C of the wheel.

The hub C, I form complete, as shown, in a single cast piece. This is cylindrical in shape, adapted interiorly to receive and firmly hold the box B, while exteriorly it is provided with an integrally-formed spoke-ring C, having pockets or mortise $C^5$ to receive the feet of the spoke D. This mortised ring is connected by a web C' to the hub-body, from which it is thus raised sufficiently to provide recesses $C^2\,C^2$ between the overhanging portion of the ring and the hub-body, for a purpose hereafter explained. Circular flanges $C^3$ and $C^4$ are also formed at the ends of the hub C, between which and the spoke-ring C' are preferably secured filling pieces or blocks H H', which are firmly held by hub-bands J J' and give the ordinary solid appearance to the hub.

The spokes D are of wood preferably of the ordinary shape, but formed in two similar parts, as indicated in Fig. 3. The meeting faces of these two parts are grooved longitudinally to receive tension-rods G, the inner ends $g'$ of which are threaded and pass through holes provided in the base of the spoke-ring C. At the outer ends these rods, as shown in Fig. 1, are engaged by bolts K, which pass through the tire F upon the rim E of the wheel and screw into tapped holes in the flattened bends $g$ of the rods, so that when nuts $g'$ upon the screw-threaded inner ends are screwed up the tension thus brought upon the rods serves to bind the whole structure firmly together, the spread of the rods at the foot of the spokes serving also to firmly brace the latter against all strains to which the wheel is subjected in service.

It is evident that the construction described may be considerably varied in detail without substantially departing from my invention. For instance, the spokes instead of being formed in two parts, as shown in Fig. 2, may be in one piece and grooved, as indicated in Fig. 4, for the reception of the rods; also, the rods G instead of being bent at the outer end and doubled, as shown in Fig. 1, may be formed in two pieces, as indicated in Fig. 5, in which latter construction the outer ends instead of being engaged by the tire-bolt are connected to the wooden rim of the wheel, as shown, thus leaving the tire independent of the tension-rods.

What I claim is—

1. In a vehicle-wheel, a metallic hub having a mortised spoke-ring with a web connection to the main body of the hub and end flanges, in combination with filling-pieces between said flanges and the spoke-ring, substantially as set forth.

2. In a vehicle-wheel the combination of a metallic hub having a web-connected spoke-ring, spokes pocketed in said ring, and tension-rods adjustably secured to the spoke-ring and extending through the spokes to the outer ends thereof substantially as set forth.

3. A vehicle-wheel comprising a metallic hub having a web-connected spoke-ring, spokes mortised in said ring, a rim upon the outer ends of said spokes, and tension-rods for each spoke secured at opposite ends to the ring and rim respectively substantially as set forth.

In testimony whereof I affix my signature in presence of two witnesses.

ULYSSES S. DRAYER.

Witnesses:
W. G. STEWART,
ADAM L. OTTERBEIN.